United States Patent
Damiano et al.

(10) Patent No.: US 11,383,442 B2
(45) Date of Patent: Jul. 12, 2022

(54) METHOD OF REMOVING DEBRIS FROM A LIQUID PHOTOPOLYMER IN AN ADDITIVE FABRICATION DEVICE

(71) Applicant: Formlabs, Inc., Somerville, MA (US)

(72) Inventors: Adam Damiano, Somerville, MA (US); Andre Comella, Whitehouse Station, NJ (US)

(73) Assignee: Formlabs, Inc., Somerville, MA (US)

( * ) Notice: Subject to any disclaimer, the term of this patent is extended or adjusted under 35 U.S.C. 154(b) by 230 days.

(21) Appl. No.: 16/867,839

(22) Filed: May 6, 2020

(65) Prior Publication Data

US 2020/0269508 A1    Aug. 27, 2020

Related U.S. Application Data

(63) Continuation of application No. 15/791,926, filed on Oct. 24, 2017, now Pat. No. 10,668,665.

(51) Int. Cl.
| | |
|---|---|
| *B01D 37/00* | (2006.01) |
| *B33Y 80/00* | (2015.01) |
| *B29C 64/35* | (2017.01) |
| *B29C 64/393* | (2017.01) |
| *B29C 64/129* | (2017.01) |
| *B33Y 50/02* | (2015.01) |
| *B29C 64/227* | (2017.01) |
| *B33Y 40/00* | (2020.01) |

(Continued)

(52) U.S. Cl.
CPC .......... *B29C 64/35* (2017.08); *B01D 39/1623* (2013.01); *B01J 8/006* (2013.01); *B29C 64/124* (2017.08); *B29C 64/129* (2017.08); *B29C 64/227* (2017.08); *B29C 64/393* (2017.08); *B33Y 10/00* (2014.12); *B33Y 40/00* (2014.12); *B33Y 50/02* (2014.12); *B29C 2037/96* (2013.01); *B29L 2031/14* (2013.01); *B29L 2031/737* (2013.01)

(58) Field of Classification Search
CPC ...... B01D 37/00; B01D 39/1623; B01J 8/006; B29C 2037/96; B29C 64/124; B29C 64/35; B29L 2031/14; B29L 2031/737; B33Y 10/00; B33Y 40/00; B33Y 80/00
USPC ................. 264/39, 401; 210/767; 528/502 A
See application file for complete search history.

(56) References Cited

U.S. PATENT DOCUMENTS

| | | | |
|---|---|---|---|
| 6,283,997 | B1 | 9/2001 | Garg et al. |
| 8,994,592 | B2 | 3/2015 | Scott et al. |

(Continued)

FOREIGN PATENT DOCUMENTS

WO    WO 2017/165832 A1    9/2017

OTHER PUBLICATIONS

U.S. Appl. No. 15/791,926, filed Oct. 24, 2017, Damiano et al.

(Continued)

*Primary Examiner* — Leo B Tentoni

(74) *Attorney, Agent, or Firm* — Wolf, Greenfield & Sacks, P.C.

(57) ABSTRACT

According to some aspects, a method is provided of removing debris from a liquid photopolymer in an additive fabrication device. According to some embodiments, a mesh of solid material may be formed in an additive fabrication device from a liquid photopolymer, and particles of debris present in the liquid photopolymer may adhere to the mesh. The debris may thereby be removed from the liquid photopolymer by removing the mesh from the additive fabrication device. The mesh may then be discarded.

16 Claims, 11 Drawing Sheets

(51) Int. Cl.
*B33Y 10/00* (2015.01)
*B29C 64/124* (2017.01)
*B01D 39/16* (2006.01)
*B01J 8/00* (2006.01)
B29L 31/14 (2006.01)
B29L 31/00 (2006.01)
B29C 37/00 (2006.01)

(56) References Cited

U.S. PATENT DOCUMENTS

2009/0283109 A1 11/2009 Moussa et al.
2013/0292862 A1 11/2013 Joyce
2015/0035206 A1 2/2015 Maggiore
2017/0232679 A1 8/2017 Gardiner et al.

OTHER PUBLICATIONS

PCT/US2018/057034, dated Dec. 31, 2018, International Search Report and Written Opinion.
PCT/US2018/057034, dated May 7, 2020, International Preliminary Report on Patentability.
Extended European Search Report dated Jul. 7, 2021 in connection with European Application No. 18869889.8.
International Search Report and Written Opinion for International Application No. PCT/US2018/057034 dated Dec. 31, 2018.
International Preliminary Report on Patentability for International Application No. PCT/US2018/057034 dated May 7, 2020.

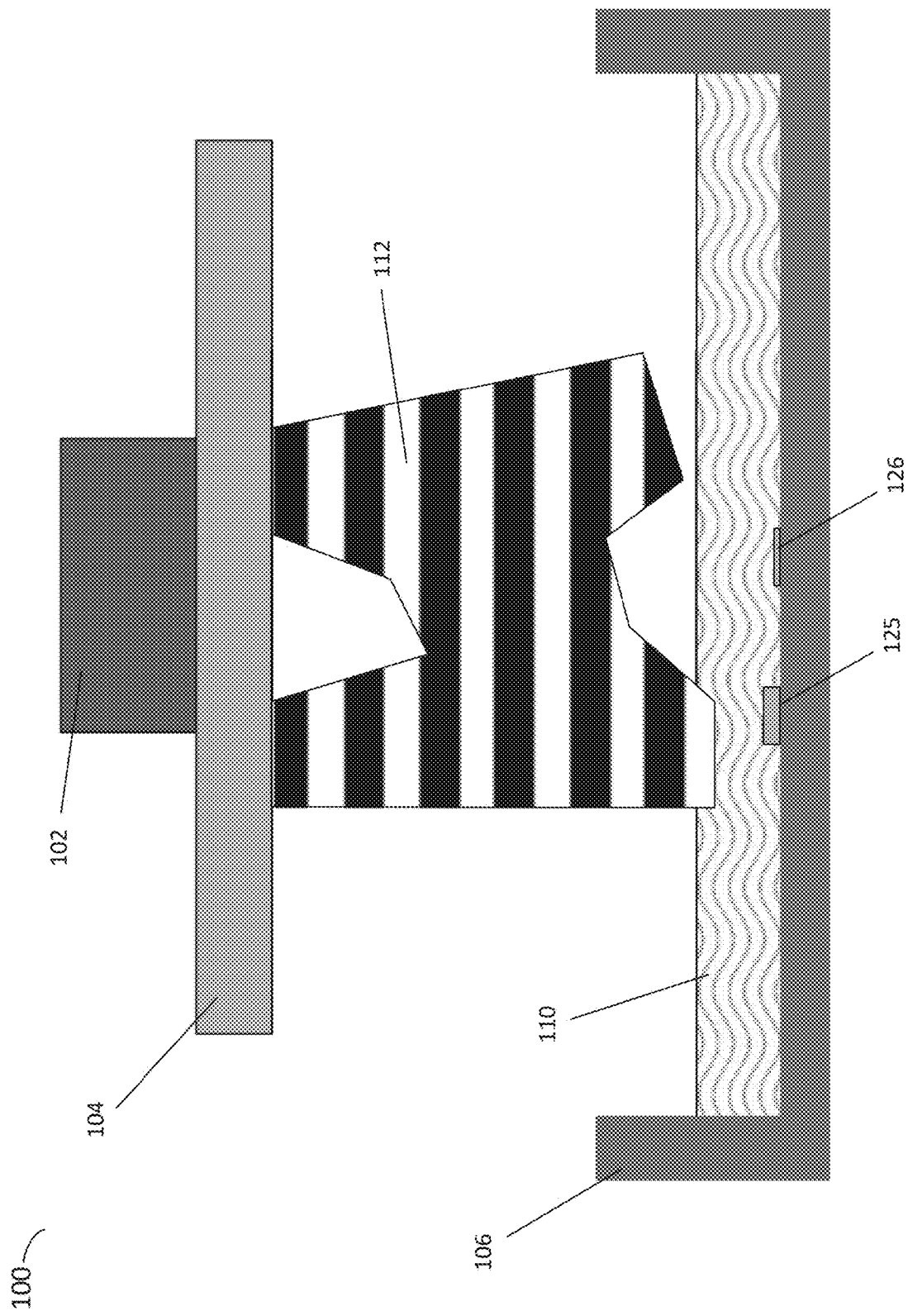

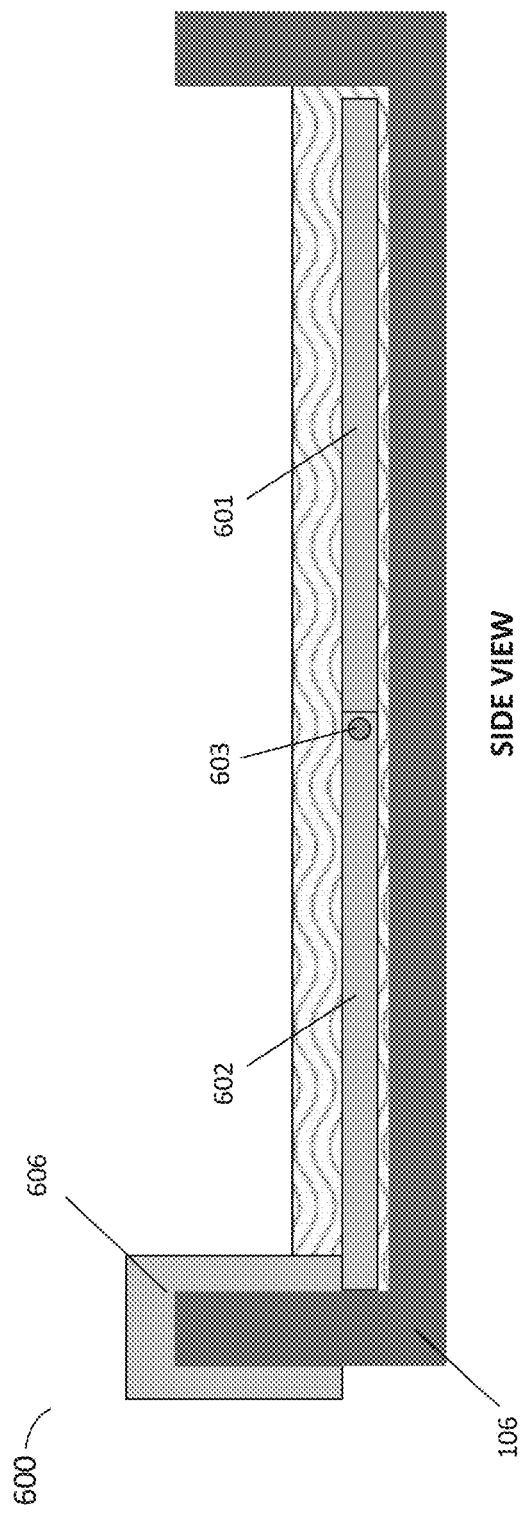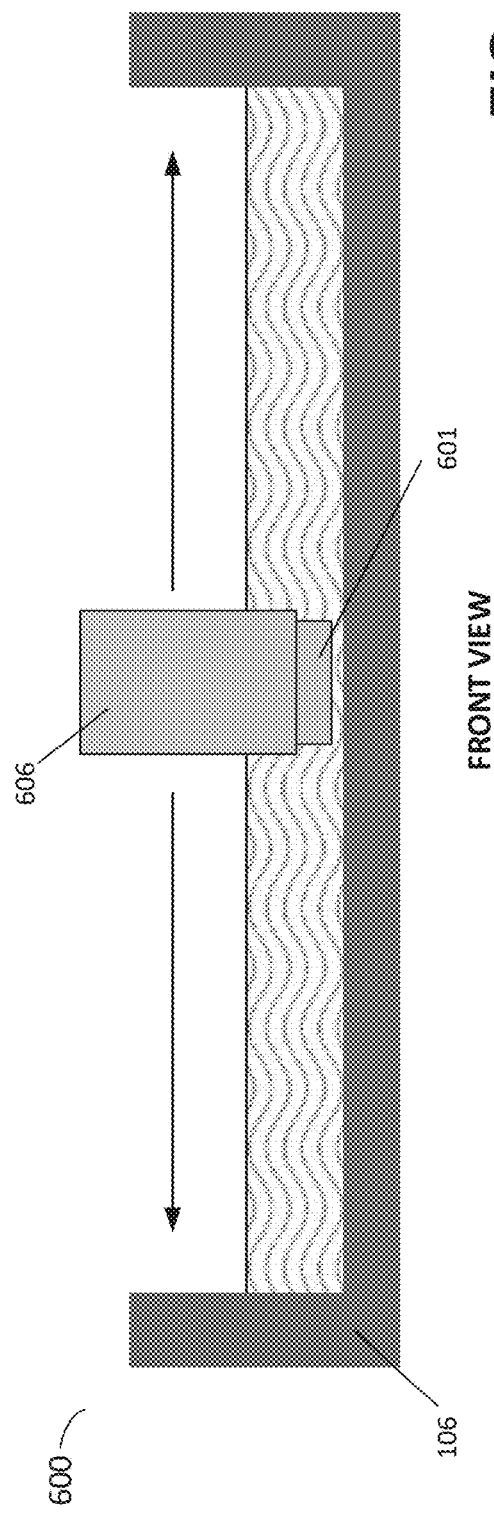

METHOD OF REMOVING DEBRIS FROM A LIQUID PHOTOPOLYMER IN AN ADDITIVE FABRICATION DEVICE

CROSS REFERENCE TO RELATED APPLICATIONS

The present application claims the benefit as a continuation under 35 U.S.C. § 120 of U.S. application Ser. No. 15/791,926, filed Oct. 24, 2017, now U.S. Pat. No. 10,668,665 B2 which is hereby incorporated by reference in its entirety.

FIELD OF INVENTION

The present invention relates generally to systems and methods for additive fabrication, e.g., 3-dimensional printing.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof.

Many additive fabrication techniques build parts by forming successive layers, which are typically cross-sections of the desired object. Typically each layer is formed such that it adheres to either a previously formed layer or a substrate upon which the object is built. In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers and the bottom surface of the build platform.

SUMMARY

According to some aspects, a method is provided of removing debris from a liquid photopolymer in an additive fabrication device, the additive fabrication device comprising a container and a build platform and configured to form layers of solid material on the build platform by photocuring liquid photopolymer in the container, the method comprising forming a mesh of solid material adhered to an interior surface of the container by directing actinic radiation to the liquid photopolymer in the container, wherein the mesh of solid material is not adhered to the build platform, and separating the mesh of solid material from the container subsequent to one or more particles of debris within the liquid photopolymer becoming adhered to the mesh of solid material.

According to some aspects, a method is provided of configuring an additive fabrication device to remove debris from a liquid photopolymer in the additive fabrication device, the additive fabrication device comprising a container and a build platform and configured to form layers of solid material on the build platform by photocuring liquid photopolymer in the container, the method comprising generating, using at least one processor, instructions that, when executed by the additive fabrication device, cause the additive fabrication device to form a mesh of solid material adhered to an interior surface of the container by directing actinic radiation to the liquid photopolymer in the container, wherein the mesh of solid material is not adhered to the build platform, and separate the mesh of solid material from the container subsequent to one or more particles of debris within the liquid photopolymer becoming adhered to the mesh of solid material.

According to some aspects, a computer readable medium is provided comprising first instructions that, when executed by at least one processor, cause the at least one processor to perform a method of configuring an additive fabrication device to remove debris from a liquid photopolymer in the additive fabrication device, the method comprising generating second instructions that, when executed by the additive fabrication device, cause the additive fabrication device to form a mesh of solid material adhered to an interior surface of a container of the additive fabrication device by directing actinic radiation to liquid photopolymer in the container, wherein the second instructions cause the additive fabrication device to position a build platform of the additive fabrication device such that the mesh of solid material is not adhered to the build platform when formed, and separate the mesh of solid material from the container subsequent to one or more particles of debris within the liquid photopolymer becoming adhered to the mesh of solid material.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 1A-1C depict an illustrative additive fabrication system, according to some embodiments;

FIGS. 6A-6B illustrate two views of an illustrative wiper, according to some embodiments;

DETAILED DESCRIPTION

As discussed above, some additive fabrication techniques form solid objects by solidifying (also referred to herein as "curing") a liquid, such as a photopolymer resin. Sometimes when using such techniques, a region of liquid may be cured to a solid or partially solid state but fail to adhere to the object being fabricated. This may occur for a variety of reasons, such as incompletely performed curing and/or adhesion of cured or partially cured material to a surface other than the object being fabricated (e.g., to a container). When this occurs, the cured or partially cured material may subsequently interfere with the successful forming of a remainder of the object, such as by adhering to an undesired location on the object and/or by inhibiting the correct formation of subsequent material (e.g., by blocking the path of a radiation source, by mechanically sticking to the object and thereby introducing undesirable forces, etc.).

Figure 1A:
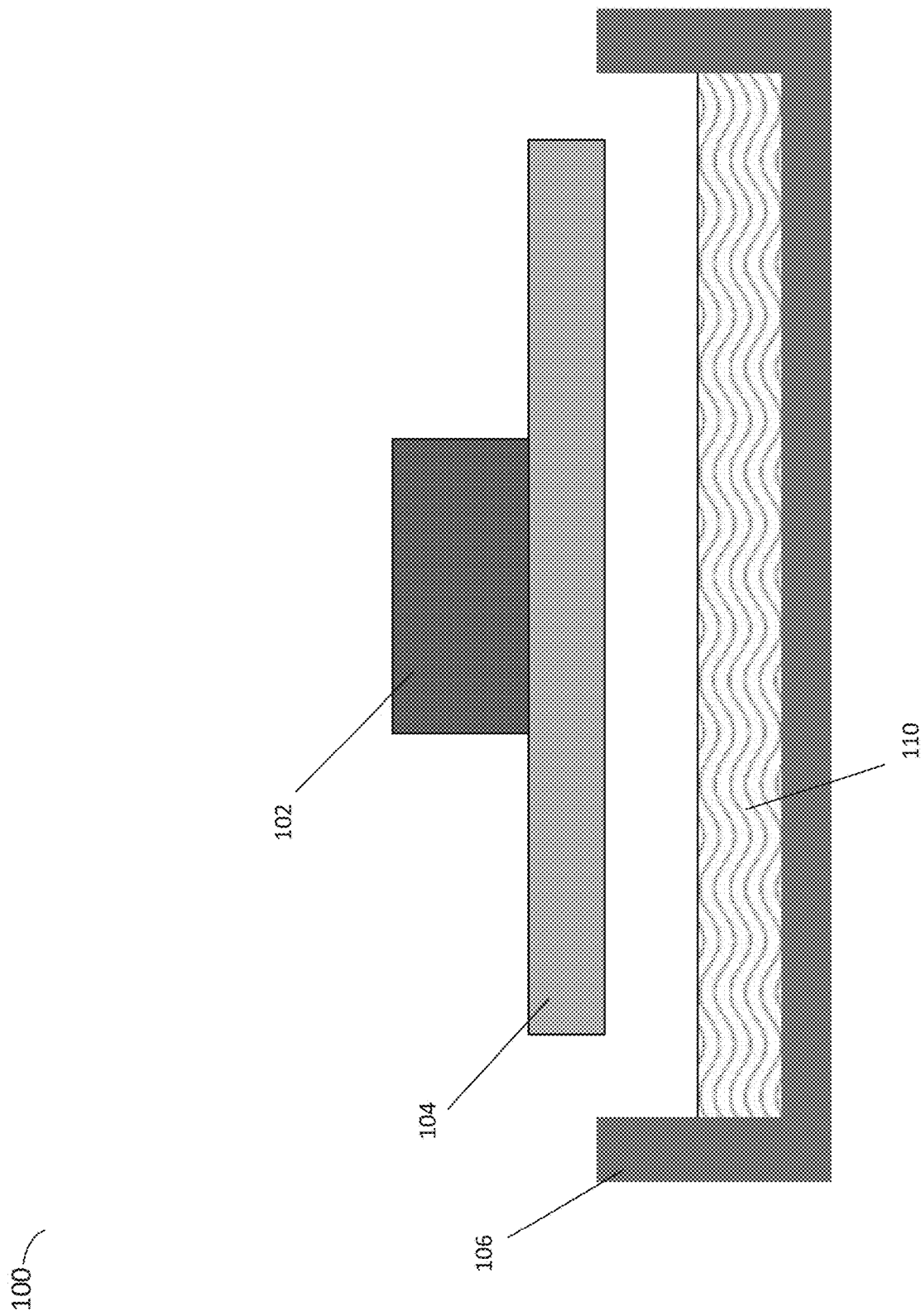
Figure 1B:
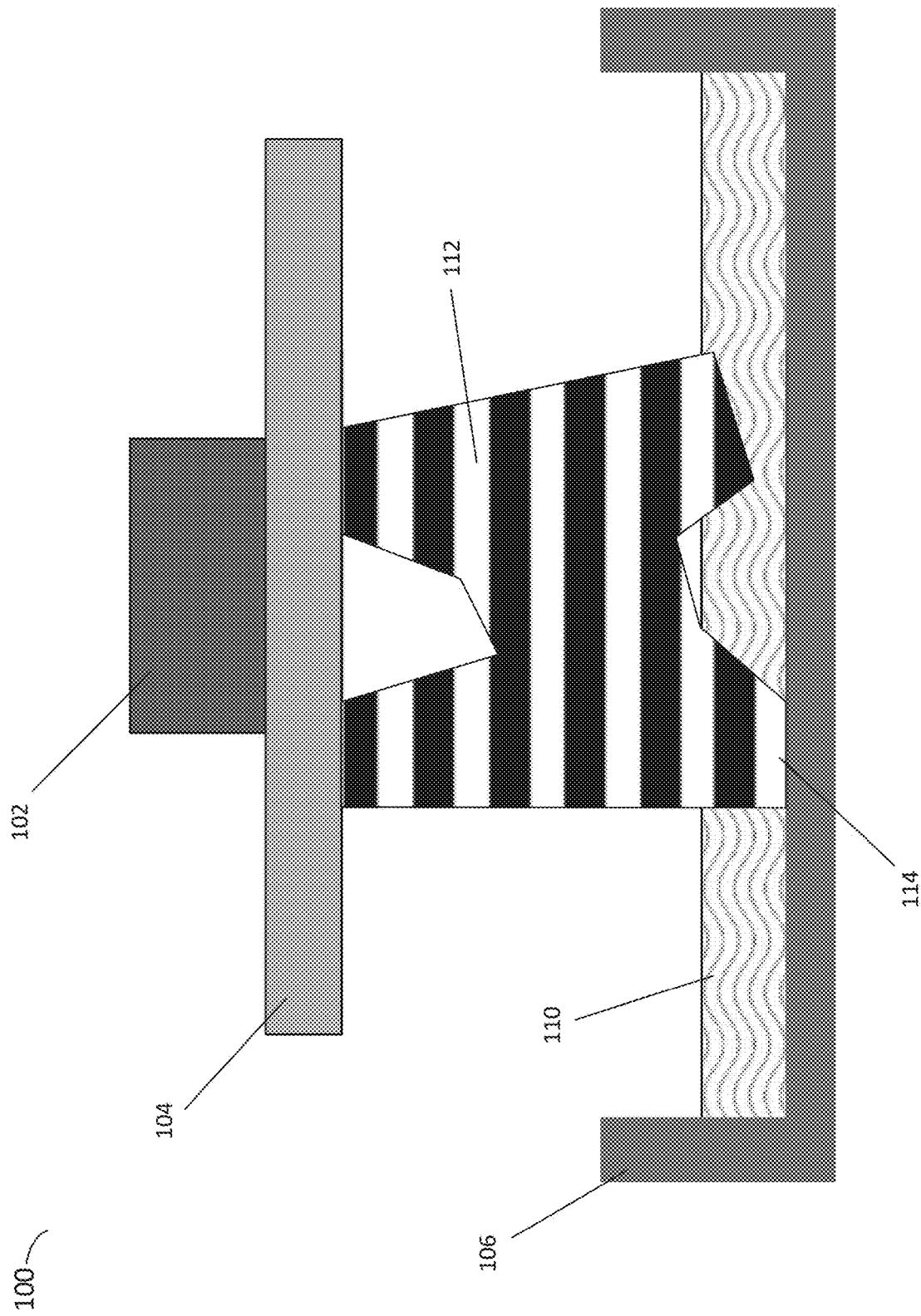

To depict an example of cured and/or partially cured material failing to adhere to an object being fabricated, an illustrative additive fabrication system is depicted in FIGS. 1A-1C. Illustrative stereolithographic printer 100 forms a part in a downward facing direction on a build platform such that layers of the part are formed in contact with a surface of a container in addition to a previously cured layer or the build platform. In the example of FIGS. 1A-1C, stereolithographic printer 100 comprises build platform 104, container 106 and liquid photopolymer 110. A downward facing build platform 104 opposes the floor of container 106, which contains a liquid photopolymer (e.g., a liquid photopolymer resin) 110. FIG. 1A represents a configuration of stereolithographic printer 100 prior to formation of any layers of a part on build platform 104.

As shown in FIG. 1B, a part 112 may be formed layerwise, with the initial layer attached to the build platform 104. In FIG. 1B, the layers of the part 112 are each formed from the same material but are shown in alternating shades merely to visually distinguish them in this example. The container's base surface may be transparent to actinic radiation, such that radiation can be targeted at portions of the thin layer of liquid photocurable photopolymer resting on the base surface of the container. Exposure to actinic radiation cures a thin layer of the liquid photopolymer, which causes it to harden. The layer 114 is at least partially in contact with both a previously formed layer and the surface of the container 106 when it is formed. The top side of the cured photopolymer layer typically bonds to either the bottom surface of the build platform 104 or with the previously cured photopolymer layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer.

Following the curing process, a separation process is typically conducted so as to break any bonds that may have been produced between the cured material of layer 114 and the bottom of container 102. Various techniques may be employed to separate the layers, include rotation and/or sliding the container relative to the build platform. As one example, build platform 104 may be moved away from the container to reposition the build platform for the formation of a new layer and/or to impose separation forces upon any bonds between cured and/or partially cured material and the bottom of the container. In some implementations, the container 106 may be mounted onto a support base such that the container can be moved along a horizontal axis of motion (left or right in FIG. 1B) to introduce additional separation forces.

As discussed above, in some cases partially and/or fully cured regions of the photopolymer may not adhere to the object being fabricated. For instance, when a layer of photopolymer is cured in contact with a previously formed solid layer (e.g., layer 114) and the bottom of container 106, and then subsequently separated from the container, some photopolymer may nonetheless still adhere to the bottom of the container after the separation. This photopolymer may, for instance, be a thin layer or partially and/or fully cured photopolymer that is at least somewhat adhered to the container, and/or may include pieces of partially and/or fully cured photopolymer that have adhered to the container. In some cases, areas of liquid photopolymer may be exposed to actinic radiation that are sufficient to only partially cure the photopolymer, such as around the edges of a beam of radiation directed to the photopolymer.

FIG. 1C illustrates two pieces of partially cured and/or fully cured photopolymer 125 and 126 that are not adhered to the part 112 after separation of the part from the container. For clarity, the pieces 125 and 126 are shown as having a larger size than might typically be expected within the scale of the figure. In general, such photopolymer pieces may have a size equal to or less than the thickness of a layer produced by the additive fabrication device, though may sometimes be of a larger size. For instance, an additive fabrication device that forms layers having a thickness of 50 μm (0.05 mm) may, in some cases, produce partially cured and/or fully cured photopolymer pieces having a dimension between 0 and 50 μm. Irrespective of their size, the partially cured and/or fully cured photopolymer pieces may be partially or fully adhered to the container 106, or may not be adhered to the container at all and may be "floating" in the photopolymer 110. These photopolymer pieces may negatively impact the formation of subsequent layers of the part 112, such as by adhering to one or more of the subsequent layers or otherwise. Moreover, if left in the liquid photopolymer, pieces 125 and 126 may interfere in the above ways with subsequent parts fabricated by the device. In extreme cases, such photopolymer pieces can block a photopolymer layer from being formed by impinging on the incident actinic radiation, leading to a missing portion in the part once fabricated.

Irrespective of how unwanted material is created in the container, such material—referred to herein as "vat debris," or simply "debris"—has conventionally been removed using various combs or filters which separate the debris from the rest of the liquid photopolymer. Such methods can be messy, time consuming and/or ineffective.

The inventors have recognized and appreciated that the tendency for debris to adhere to the surface of later-formed solid material, which conventionally may lead to undesirable effects during fabrication, may instead be utilized to improve the debris capture and removal process. In particular, one or more layers of an object referred to herein as a "cleaning mesh" (or simply "mesh") may be fabricated to intentionally cause debris to adhere to the mesh. The debris can thereby be removed from the container by removing the mesh from the container. The mesh may then be discarded.

In some embodiments, the geometry of a mesh may be selected to capture debris across an area of the bottom of the liquid photopolymer container whilst also minimizing the amount of material needed to fabricate the mesh. For instance, the mesh may occupy enough locations within a volume at the bottom of the container that debris of expected sizes will necessary contact and adhere to the mesh, yet without the mesh necessarily covering the entire surface area of the bottom of the container.

A cleaning mesh may be formed in any number of layers of material, and in some cases may be formed with a single layer of material. As described above, in an inverse stereolithography process, typically a part is formed by first forming a layer of material adhered to the build platform and the container, separating the layer from the container, forming another layer onto the first and adhered to the container, etc. With respect to a cleaning mesh, however, it may not be necessary to form material on the build platform if a single layer mesh is to be formed adhered to the container and then removed. As such, for a single layer mesh, the build platform may be maneuvered away from the bottom of the container (e.g., out of the photopolymer liquid entirely) during fabrication of the mesh. In other cases, however, a cleaning mesh may be formed from numerous layers on a build platform as in the conventional approach to fabricating parts described above.

In some embodiments, fabrication of a cleaning mesh may be performed in a different manner to how fabrication of a part is typically performed by the additive fabrication device. In particular, the actinic radiation used to form the cleaning mesh may be applied to the liquid photopolymer in a different manner than is typical for the additive fabrication device when forming parts. For instance, when forming the cleaning mesh, the power of the radiation source may be increased, the exposure time may be lengthened and/or radiation may be directed to desired regions of the liquid photopolymer additional times compared with use of the radiation when forming parts. In some embodiments, a mesh may be fabricated using customary exposure paths but with an intensity of actinic radiation equal to 10-20 times the amount typically applied when fabricating parts. In some embodiments, a mesh may be fabricated using customary exposure paths but by making 10-20 discrete passes over those paths when fabricating parts.

In some embodiments, a cleaning mesh may be fabricated in certain locations only where the locations have been identified as locations where a cleaning mesh is needed. For instance, a computer system that generates instructions for execution by an additive fabrication device to fabricate a mesh may initially identify locations and generate the instructions so as to only fabricate the mesh in those locations. In some embodiments, desired locations may be identified by detecting debris within the additive fabrication device, by detecting part failures and/or based on one or more footprints of one or more previously fabricated parts.

In some embodiments, an additive fabrication device may be configured to automatically remove a cleaning mesh after its fabrication. Conventionally, automated removal of a part can be challenging to perform without risking damage to the part, however in the case of a cleaning mesh—which is going to be discarded—that potential risk is less relevant, or even irrelevant. As a result, a suitable removal mechanism, such as a wiper, may be employed to detach a cleaning mesh from the build platform and/or container to which it is adhered.

Following below are more detailed descriptions of various concepts related to, and embodiments of, techniques for debris removal via fabrication of a cleaning mesh. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 2:
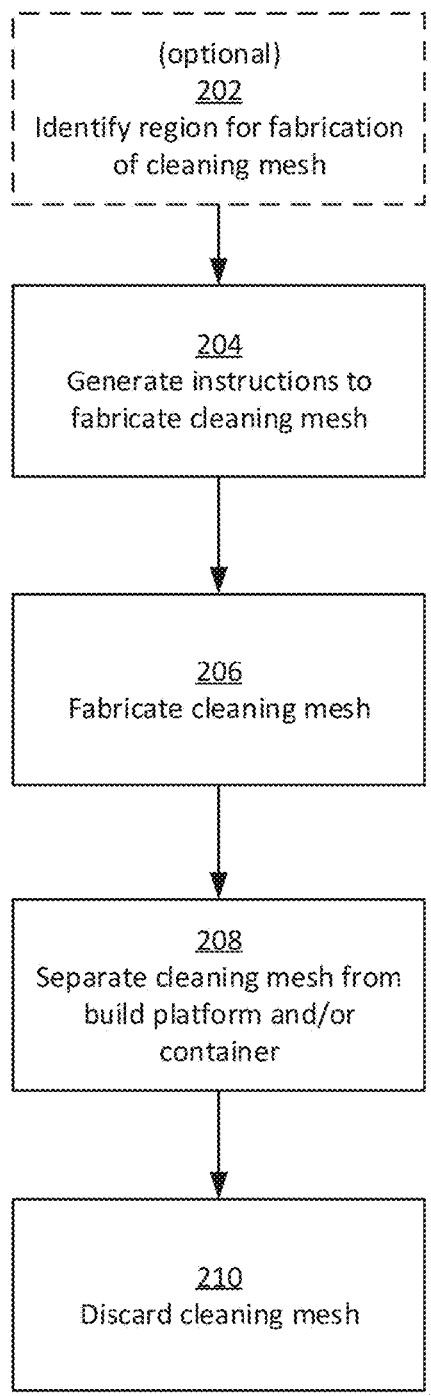
FIG. 2 is a flowchart of a method of debris removal via fabrication of a cleaning mesh, according to some embodiments.

FIG. 2 is a flowchart of a method of debris removal via fabrication of a cleaning mesh, according to some embodiments. Method 200 may be performed by an additive fabrication device or an additive fabrication device in conjunction with an external computing device, examples of which are described below.

Method 200 optionally begins in act 202 in which a region of a container may be identified for which a cleaning mesh will be generated. Once such a cleaning region has been identified, the geometry of a cleaning mesh may be generated to cover that region. The region for which a cleaning mesh will be generated may be determined by initially identifying one or more areas in which cleaning may be desirable, and then determining a region for the cleaning mesh based on those identified areas. For instance, the cleaning mesh region may be determined to be simply the one or more identified areas. Alternatively, the cleaning mesh region may be determined by scaling and/or offsetting the identified one or more areas from the perimeter of the areas. In cases where multiple areas in which cleaning may be desirable are identified, a single cleaning mesh region may be determined to cover these areas, or multiple cleaning mesh regions may be determined according to the areas to which separate cleaning meshes will be fabricated. In embodiments in which the additive fabrication device includes a wiper, the region for which a cleaning mesh will be generated may be adapted based on expected motion of the wiper and how that motion is expected to cause movement of debris in the container. For instance, the region may be extended in the direction of motion of the wiper.

In some embodiments, one or more areas in which cleaning may be desirable may be identified in act 202 by detecting debris in the container and selecting a cleaning mesh region based on locations in which the debris was detected. Debris may be directly detected via various means, such as remote sensing, computer vision, or user intervention. Based upon the locations of such debris detections, one or more areas associated with the detected debris may be identified and one or more cleaning meshes generated specifically for said areas. In such embodiments, areas surrounding detected debris may be predetermined or user specified shapes of specific sizes centered at each debris location.

In some embodiments, one or more areas in which cleaning may be desirable may be identified in act 202 by inferring and/or indirectly detecting the presence of debris. As one example, part failures may be detected through various means such as remote sensing, computer vision, and/or user intervention. Following such a detection, probable locations for potential debris may be determined. In some such embodiments, part geometry may be analyzed to determine areas most likely to have caused debris in potential failure modes. These areas may then be used to determine locations where cleaning meshes should be formed to capture debris from said failure mode.

In some embodiments, one or more areas in which cleaning may be desirable may be identified in act 202 based on a "footprint" of a previously formed part. For example, the last cross-section of the last part formed by the additive fabrication device may be determined and used as a footprint. In other cases, a footprint may be determined based upon more than one previously formed layer, such as by taking the maximum extent of completed layers of a last-formed part as the footprint.

In some embodiments, one or more areas in which cleaning may be desirable may be identified in act 202 by calculating a profile of the convex 2D hull of a part, or multiple previously formed parts, in reference to the plane of the bottom of the container, and using the profile a footprint. Suitable profiles may be generated in various ways, including calculation of a convex 2D hull, dilation of part perimeters, or Minkowski sums.

In act 204, instructions are generated to fabricate a cleaning mesh. A suitable computing device and/or an additive fabrication device may generate such instructions, which are configured to cause the additive fabrication device to fabricate a cleaning mesh. The cleaning mesh may have a predetermined geometry or may be generated in act 204 according to one or more parameters (e.g., debris particle size) and/or the cleaning mesh region identified in optional act 202. Instructions to fabricate a cleaning mesh, whether predetermined or generated in act 204, may include instructions to fabricate the mesh in any number of layers, including a single layer. In embodiments in which a cleaning mesh region is identified in act 202, the cleaning mesh geometry may be determined by performing a Boolean operation between a mesh geometry and the identified region to produce a cleaning mesh geometry located only in the identified region.

In some embodiments, a cleaning mesh geometry may be generated based on an expected size of debris particles. For example, if the average expected size of a debris particle is R, a cleaning mesh may be generated as having a structure such that all points within the structure are within a distance R of the structure, thereby ensuring that most debris will contact the cleaning mesh once it is fabricated. In some embodiments, the size of debris particles may be measured using a suitable sensor, such as via image recognition or other optical properties, and the cleaning mesh geometry based on such measurements.

In some embodiments, a cleaning mesh geometry may be generated to include one or more features intended to assist in removal of the cleaning mesh from the additive fabrication device subsequent to its fabrication. In some cases, a feature may be shaped to guide a removal device such as a blade or the edge of a wiper between the lower surface of the cleaning mesh and the bottom of the container. For instance, the edge may be chamfered. In some cases, features in the plane of the bottom of the container may also be added, such as a tab or other protrusion away from the main body of the cleaning mesh. In some embodiments, a raft portion may be generated to be included in the cleaning mesh, such as, but not limited to, those raft portions described in U.S. patent application Ser. No. 14/501,967, titled "Systems and Methods of Post-Processing Features for Additive Fabrication," filed Sep. 30, 2014, which is hereby incorporated by reference in its entirety.

In some embodiments, instructions to fabricate a cleaning mesh may include instructions to initially form an inhibition layer at the bottom surface of the container prior to fabrication of the cleaning mesh itself. Such a layer may be created via oxygen perfusion into the resin from the bottom surface of the container and may help to ensure a small gap exists between the bottom surface of the container and the cleaning mesh, thereby making removal of the mesh easier. Such a gap may be increased by reducing the total or peak energy of actinic radiation to which the removal features are exposed.

In act 206, an additive fabrication device may fabricate the cleaning mesh by executing the instructions generated in act 204. Subsequent to fabrication of the cleaning mesh, it may be removed from the build platform and/or the container in act 208. In some embodiments, a cleaning mesh may be fabricated in a single layer that is adhered to the container but not the build platform. In other embodiments, a cleaning mesh may be fabricated adhered to the build platform and, in some cases, also adhered to the container. Removal of the cleaning mesh may be manual (i.e., a user may remove the mesh) or may be automated by one or more components of the additive fabrication device, such as a wiper.

In some embodiments, one or more removal devices may be located in the area of the cleaning mesh prior to its fabrication. During the forming of the cleaning mesh, such removal devices may be incorporated into the cured material of cleaning mesh, such as by enclosure of adhesive forces. Removal of the cleaning mesh may be then be achieved or assisted by application of forces through removal devices, which may then be either disposed of or separated from the cleaning mesh and reused. In some embodiments, such a process may be partially or fully automated. As one example, a cleaning mesh may be formed in contact with a wiper and the wiper then moved in order to cause the cleaning mesh to separate from the bottom of the container. An additive fabrication device configured to perform automated removal of a cleaning mesh may be configured to wait for a predetermined length of time subsequent to fabrication of the cleaning mesh before performing a removal operation to ensure that there has been sufficient time for the mesh to continue to cure and adhere any debris weakly bonded to the mesh.

In act 210, the cleaning mesh separated from the additive fabrication device in act 208 may be discarded.

Figure 3:
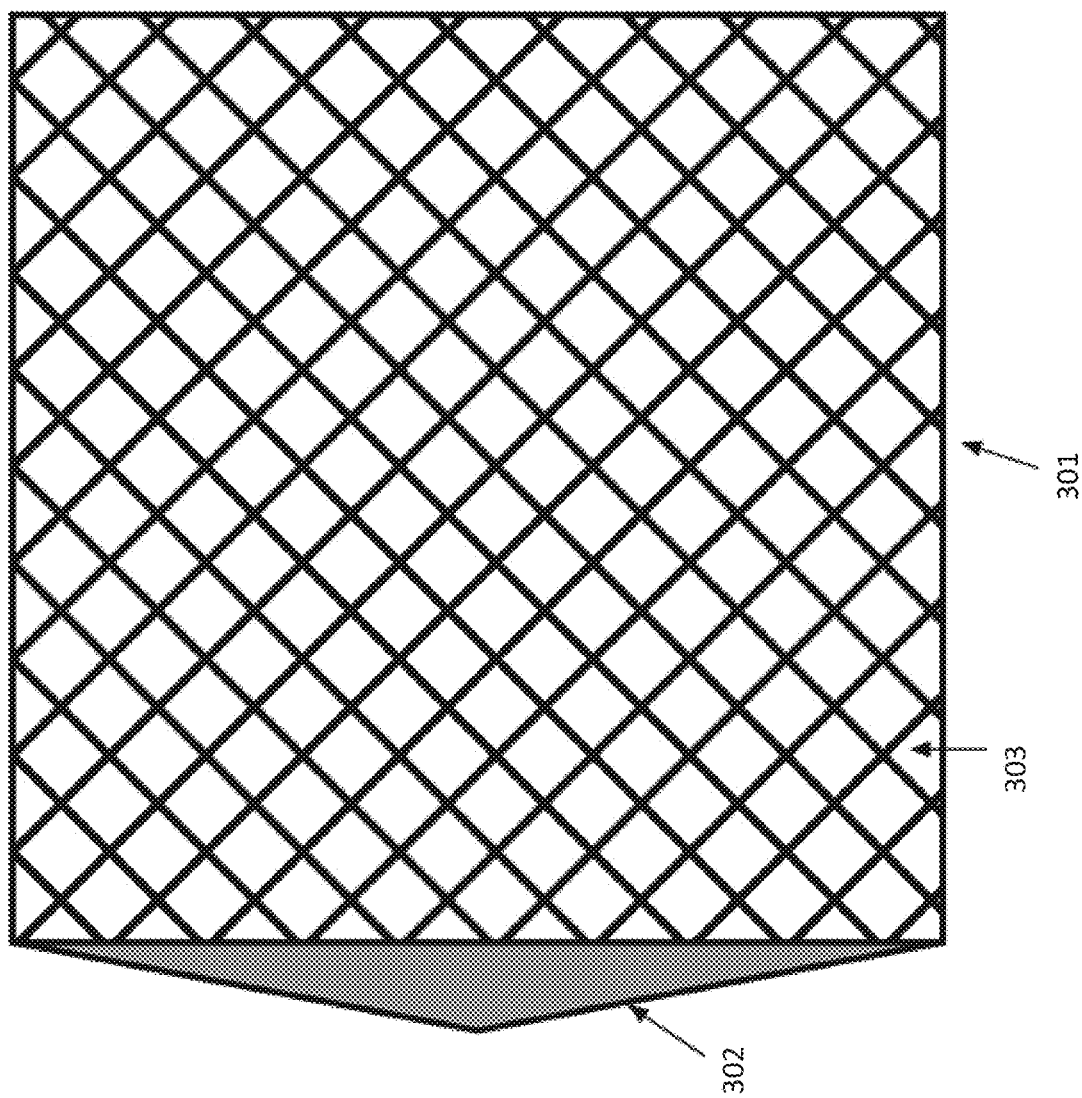
FIG. 3 depicts an illustrative cleaning mesh having a chamfered edge, according to some embodiments.

FIG. 3 depicts an illustrative cleaning mesh having a chamfered edge, according to some embodiments. As discussed above, in some cases a cleaning mesh geometry may be generated to include an edge that allows easier removal of the fabrication cleaning mesh from a surface to which it is adhered. In the example of FIG. 3, cleaning mesh 301 is shown as a two-dimensional object that would be fabricated across the surface of a container and/or build platform, having any suitable thickness. The interior of the cleaning mesh has a grid geometry 303 (i.e., material along the grid lines with spaces between) so that debris may be captured by the mesh whilst conserving material in production of the mesh. The tab 302 is a solid region of material shaped to guide a removal tool in removing the mesh from the container or the build platform, depending on which surface(s) it is adhered to.

Figure 4:
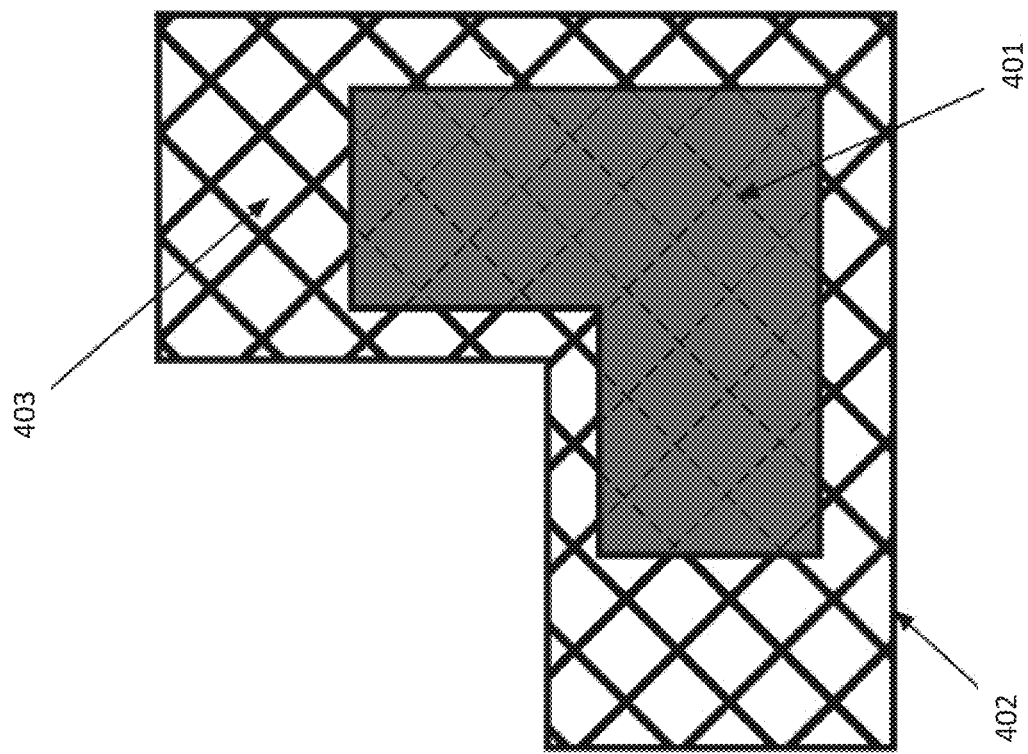
FIG. 4 depicts an illustrative cleaning mesh having a geometry determined according to a footprint, according to some embodiments.

FIG. 4 depicts an illustrative cleaning mesh having a geometry determined according to a footprint, according to some embodiments. As discussed above, a footprint may be determined as an area in which cleaning may be desirable and a cleaning mesh region determined based on the footprint. In the example of FIG. 4, a cleaning mesh 402 may be generated according to a footprint 401. As illustrated, the area of the cleaning mesh is based on the footprint with a number of scaling and offsetting operations performed, and filled with a grid geometry. The footprint 401 is shown on the figure to illustrate how it aligns with the cleaning mesh geometry, but does not represent any portion of the cleaning mesh once fabricated. Portions of the cleaning mesh located in the same position as the footprint are illustrated with dashed lines.

Figure 5A:
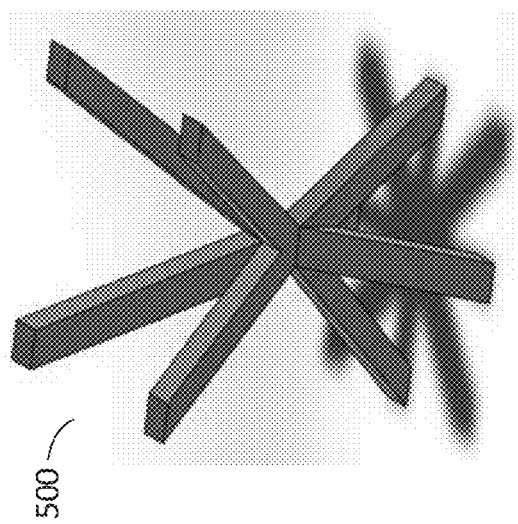
FIGS. 5A-5B illustrate a cleaning mesh formed from a repeating unit cell, according to some embodiments.
Figure 5B:
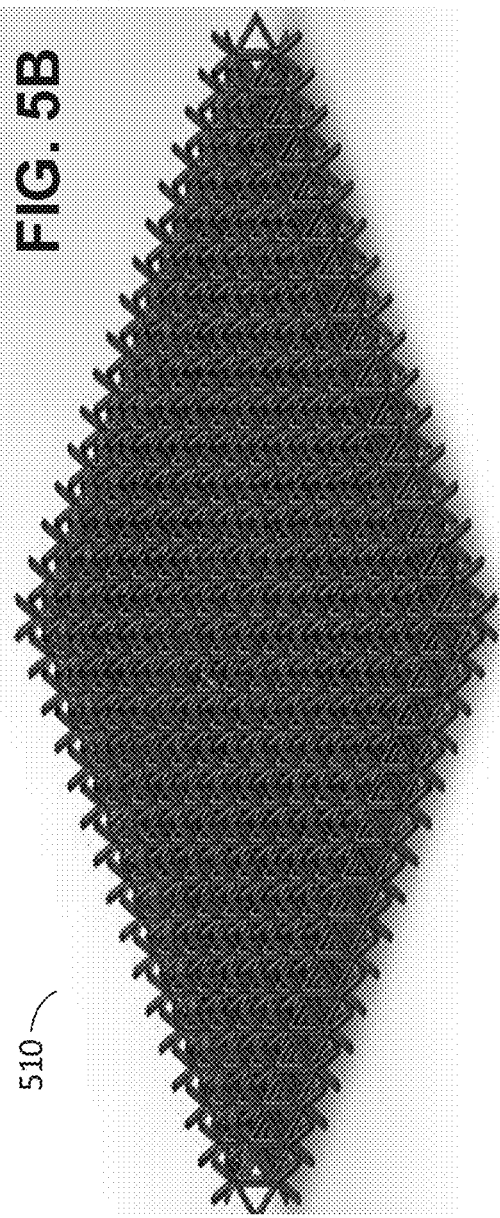

FIGS. 5A-5B illustrate a cleaning mesh formed from a repeating unit cell, according to some embodiments. The example of FIGS. 5A-5B depict a cleaning mesh formed from multiple layers of material and that comprises a unit cell 500, shown in FIG. 5A, tiled times across an area to produce a cleaning mesh 510. This is one illustrative geometry for a cleaning mesh which may be fabricated. The mesh 510 may be fabricated using typical fabrication settings or, if preferred, at increased energy or exposures, such as described above.

FIGS. 6A-6B illustrate two views of an illustrative wiper, according to some embodiments. As discussed above, in some cases a cleaning mesh may be automatically removed from a surface to which it is adhered (e.g., the bottom of the container) by a wiper. Also, in some cases, the cleaning mesh may be, at least in part, fabricated in contact with a wiper such that motion of the wiper may cause the mesh to separate from an adhered surface. In the example of FIGS. 6A-B, an illustrative wiper is positioned over the end of container 106 and configured to slide across the base surface of the container (i.e. the surface on which the liquid resin rests) in the directions of the arrows shown in FIG. 6B. The wiper may, or may not, make contact with the base surface. The wiper includes a support structure 606, a wiper blade 601 and a wiper arm 602. The wiper blade and wiper arm are connected by a pivoting coupling 603.

According to some embodiments, the pivoting coupling 603 may be any suitable mechanical connection having at least some rotational freedom. For instance, the coupling 603 may include a pin joint (also sometimes called a "revolute joint" or a "hinge joint"), a ball and socket joint, a knuckle joint, or combinations thereof. According to some embodiments, the coupling 603 may permanently affix the wiper blade 601 to the wiper arm 602, and/or may attach to the wiper blade 601 in some other way, such as via a removable snap fit connection.

According to some embodiments, the wiper may be removably mounted onto the container 106. Such a removable attachment may facilitate removing a container and installing the same or a different container. According to some embodiments, the height of support structure 606 may be selected so as to push wiper blade 601 towards the bottom of the container.

According to some embodiments, the wiper blade 601 may be coupled to the wiper arm at a location along the axis of the wiper blade 601 orthogonal to the wiper motion direction shown in FIG. 6B. In such a configuration, a connection formed by the coupling 603 forms an axis of rotation along the length of the coupling 603 around which the wiper blade 601 may rotate. That is, the wiper blade may include a portion that is located below the wiper arm in addition to a portion that extends beyond the wiper arm. For example, the coupling may be located approximately at a midpoint of the wiper arm along the axis of the blade orthogonal to the wiper motion, such that approximately half of the wiper blade is located beneath the wiper arm (and therefore between the wiper arm and the container). Such a configuration may allow the wiper blade to contact the container whilst the wiper arm provides structural support but does not contact the container.

In addition to rotational flexibility, according to some embodiments the wiper arm 602 may comprise one or more flexible materials to provide for additional vertical motion and flexibility or, as described above, to introduce a force between the wiper blade 601 and the bottom of the container by arranging the arm and blade components of the wiper to apply such a force once mounted to the side of the container.

According to some embodiments, wiper blade 601 may include at least one wiper edge that extends below the main body of the wiper blade 601 substantially across the long axis of the wiper blade 601. Such an edge may contact a container to move liquid photopolymer resin to desired locations.

Figure 7:
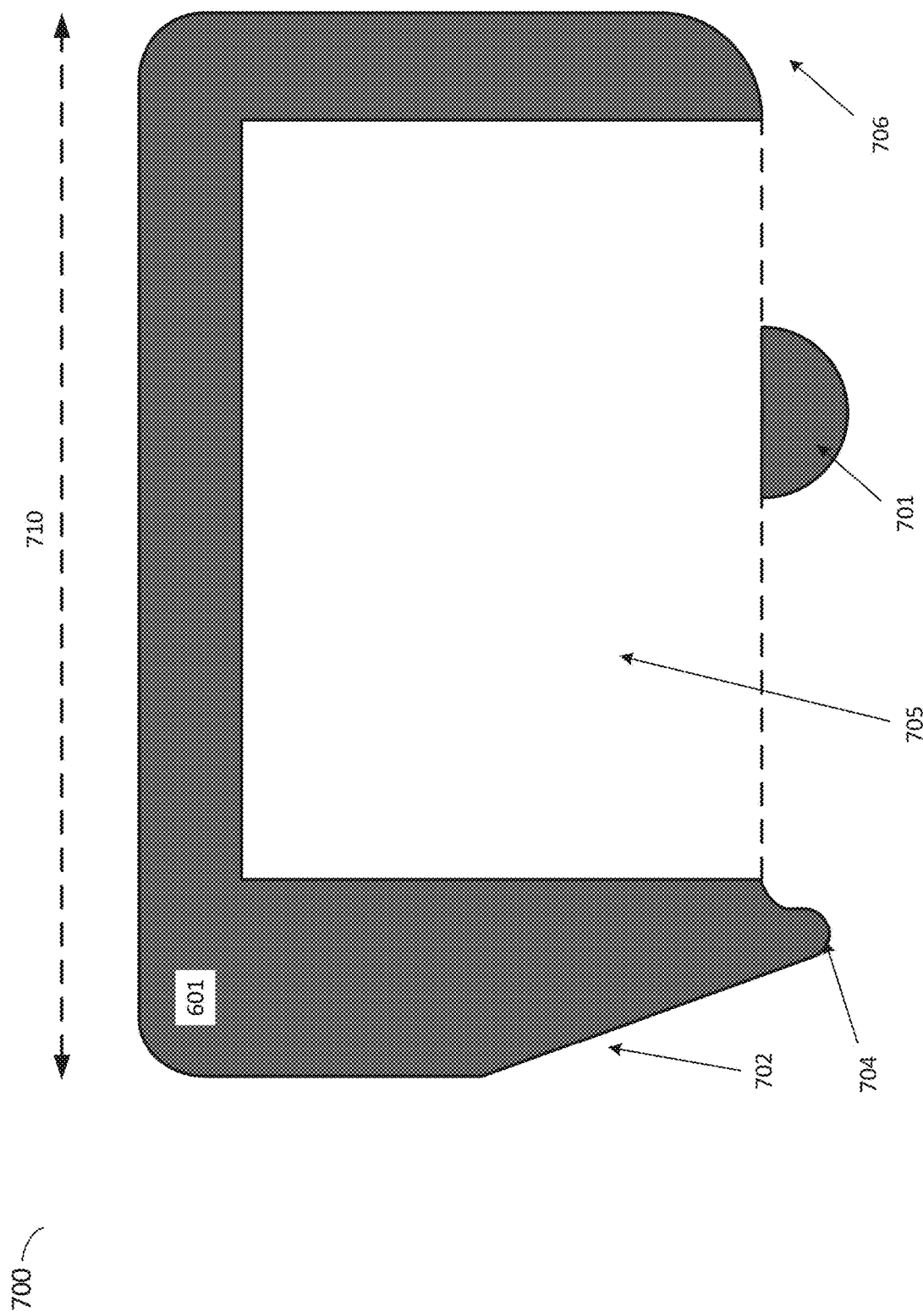
FIG. 7 depicts a cross sectional view of an illustrative wiper blade along the horizontal axis of motion, according to some embodiments.

FIG. 7 depicts a cross sectional view of an illustrative wiper blade along the horizontal axis of motion, according to some embodiments. According to some embodiments, an illustrative cross-section of one implementation of wiper blade 601 shown in FIGS. 6A-6B is depicted in FIG. 7.

FIG. 7 depicts a cross sectional view of wiper blade 601 along the horizontal axis of motion 710. Wiper blade 601 includes at a wiper edge 704 that extends below the main body of the wiper blade 601 substantially across the long axis of the wiper blade 601 (e.g., in directions into and/or out of the page). Embodiments following the example shown in FIG. 7 may utilize the wiper edge 704 to interact with the bottom of container 106, including moving liquid photopolymer or other materials to desired locations. In order to maximize the effectiveness of such an operation, it may be desirable that the wiper edge 704 be maintained flush to the bottom of the container during operation. As such, it may be particularly advantageous to combine wiper edge 704 with an additional stabilizing feature, 701, in order to improve the stability of the wiper blade 601, and thus wiper edge 704, during operation. In FIG. 7 the wiper blade is shown in cross section, and in order to clearly depict void space 705, points at which the feature 701 attaches to the wiper blade are not shown.

In some embodiments, pin 603 mounting the wiper blade 601 to the wiper arm 602 may not provide sufficient constraint to the wiper blade 601 to prevent at least some undesired rotation around the long axis of the wiper blade 601. To mitigate this problem, the wiper edge feature 704 and stabilizing feature 701 may, alone or in combination, provide additional constraints to the motion of the wiper blade 601 against the bottom surface of the container 106. In some embodiments, stabilizing feature 701 may extend the full length of the wiper along the long axis. However, in some embodiments, stabilizing feature 701 may be present in only particular sections of the wiper blade 601, such as being located at the middle and/or ends of the long axis of the wiper 601. Additional sloping features 702 may be added to the wiper blade 601 in order to reduce the resistance of the wiper blade 601 when moving through the liquid material contained within the tank.

The configuration depicted in FIG. 7 may offer several advantages. As an example, as mentioned above, it may be desirable that the wiper edge 704 be maintained at a uniform distance from or flush to the bottom of the container during operation. One way to maintain such a uniform distance is to ensure the supporting structure constrains the motion of the wiper blade 601 in relation to the orientation of the container, particularly with respect to the bottom of said container. Maintaining such an orientation (sometimes referred to as "tramming") however, may be a source of operator and/or mechanical difficulty. In contrast, the limited range of rotation allowed by mounting using pin 603 significantly reduces the extent to which the wiper arm 602 and wiper blade 601 must be properly aligned with the bottom and side surfaces of the container 106, while maintaining effective contact between the wiper edge 704 and bottom of the container. In addition, by affixing the wiper blade 601 to the wiper arm 602 at a location towards the middle of the wiper blade 601, the wiper arm 602 forms a cantilevered mount for the wiper blade 601 from only one side of the wiper 601, while still providing for sufficient support during the operation of the wiper blade 601 in the additive fabrication processes. Such a mount may tend to allow for a more easily removable container 601, as well as reducing the complexity of the mechanisms required to mount the wiper blade 601 onto the supporting structures.

As discussed above, it may be desirable for a wiper to incorporate a void space, also referred to herein as a "resin-retaining chamber." As discussed above, a void space may be provided within wiper blade 601. In the example of FIG. 7, a chamber 705 is formed within the wiper blade 601 with walls on four sides provided by the wall containing the wiper edge 704, the opposing wall with gap 706, and walls connecting the previous two walls along the sides.

In the example of FIG. 4, the lower bound of the chamber 705 is left open so as to allow for the flow or resin into and out of the chamber 705 through a gap. The upper bound of the chamber 705 may be enclosed, but the wiper blade may include one or more vents at locations above the expected resin level, so as to allow for pressure relief due to changing fluid levels within the chamber. In some embodiments, resin-retaining chamber 705 may comprise substantially all of the interior volume of a wiper blade 601 and extends across the long axis of the wiper blade 601 to cover the full width of the object building area. In some embodiments, resin-retaining chamber 705 may be restricted with internal dividers and/or limits. In some embodiments, the inventors have found it may be advantageous for the internal volume of the wiper blade 601 used as a resin-retaining chamber 705 to be between 5 cm$^3$ and 25 cm$^3$, such as between 10 cm$^3$ and 20 cm$^3$, such as approximately 13.8 cm$^3$.

Figure 8:
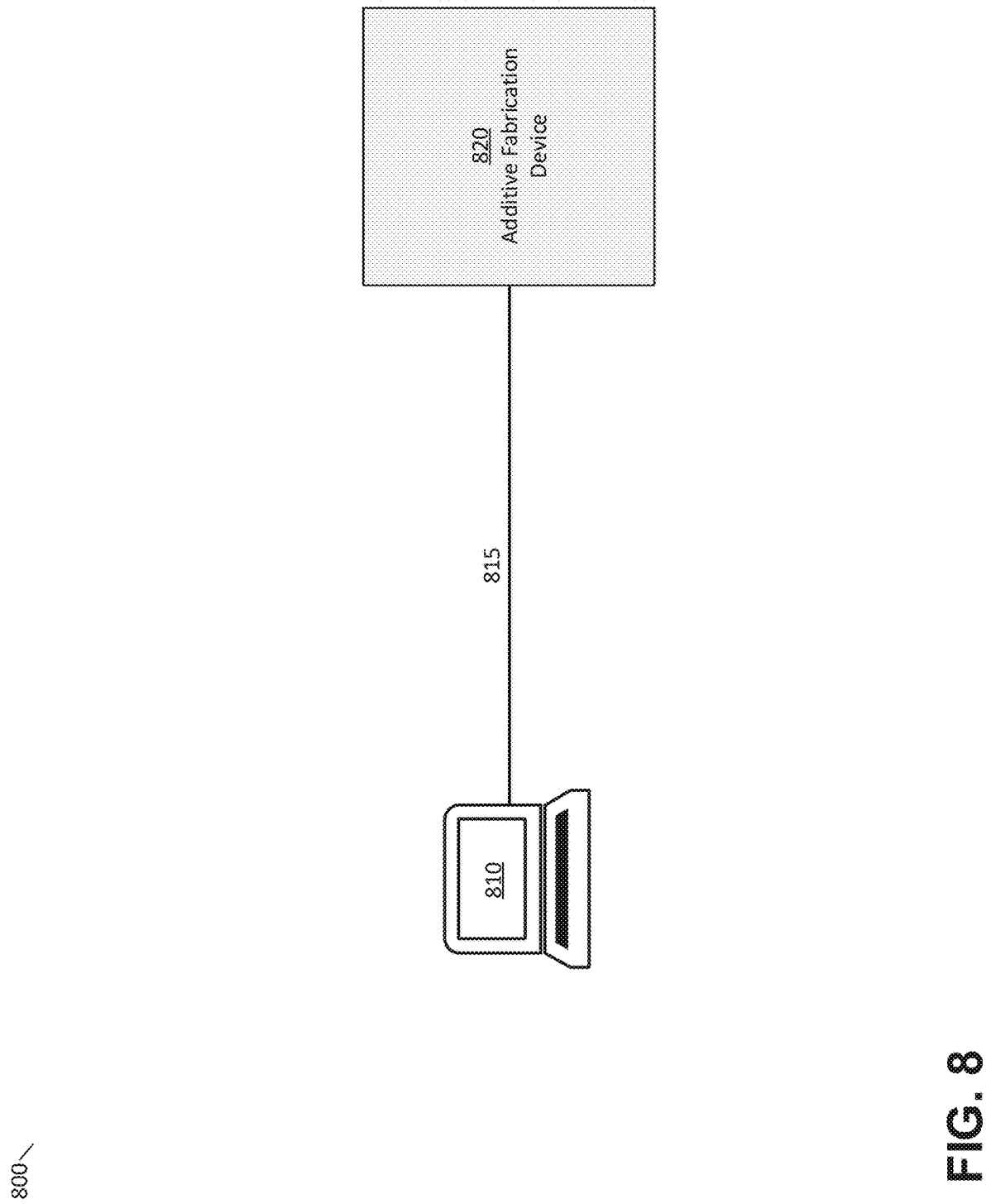
FIG. 8 is a block diagram of a system suitable for practicing aspects of the invention, according to some embodiments.

FIG. 8 is a block diagram of a system suitable for practicing aspects of the invention, according to some embodiments. System 800 illustrates a system suitable for generating instructions to perform additive fabrication by an additive fabrication device and subsequent operation of the additive fabrication device to fabricate an object. For instance, instructions to fabricate a cleaning mesh as described by the various techniques above may be generated by the system and provided to the additive fabrication device. Various parameters associated with generating of a cleaning mesh, such as a geometrical model of a cleaning mesh, parameters describing expected debris size, etc. may be stored by system 800 and accessed when generating instructions for the additive fabrication device 820 to fabricate the cleaning mesh.

According to some embodiments, computer system 810 may execute software that generates two-dimensional layers that may each comprise sections of an object, such as a cleaning mesh. Instructions may then be generated from this layer data to be provided to an additive fabrication device, such as additive fabrication device 820, that, when executed by the device, fabricates the layers and thereby fabricates the object. Such instructions may be communicated via link 815, which may comprise any suitable wired and/or wireless communications connection. In some embodiments, a single housing holds the computing device 810 and additive fabrication device 820 such that the link 815 is an internal link connecting two modules within the housing of system 800.

Having thus described several aspects of at least one embodiment of this invention, it is to be appreciated that various alterations, modifications, and improvements will readily occur to those skilled in the art. As one example, although the preceding disclosures are directed to the removal of debris, other objects such as other forms of particles, foreign components, or other materials may be removed using the techniques disclosed herein. Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Figure 9:
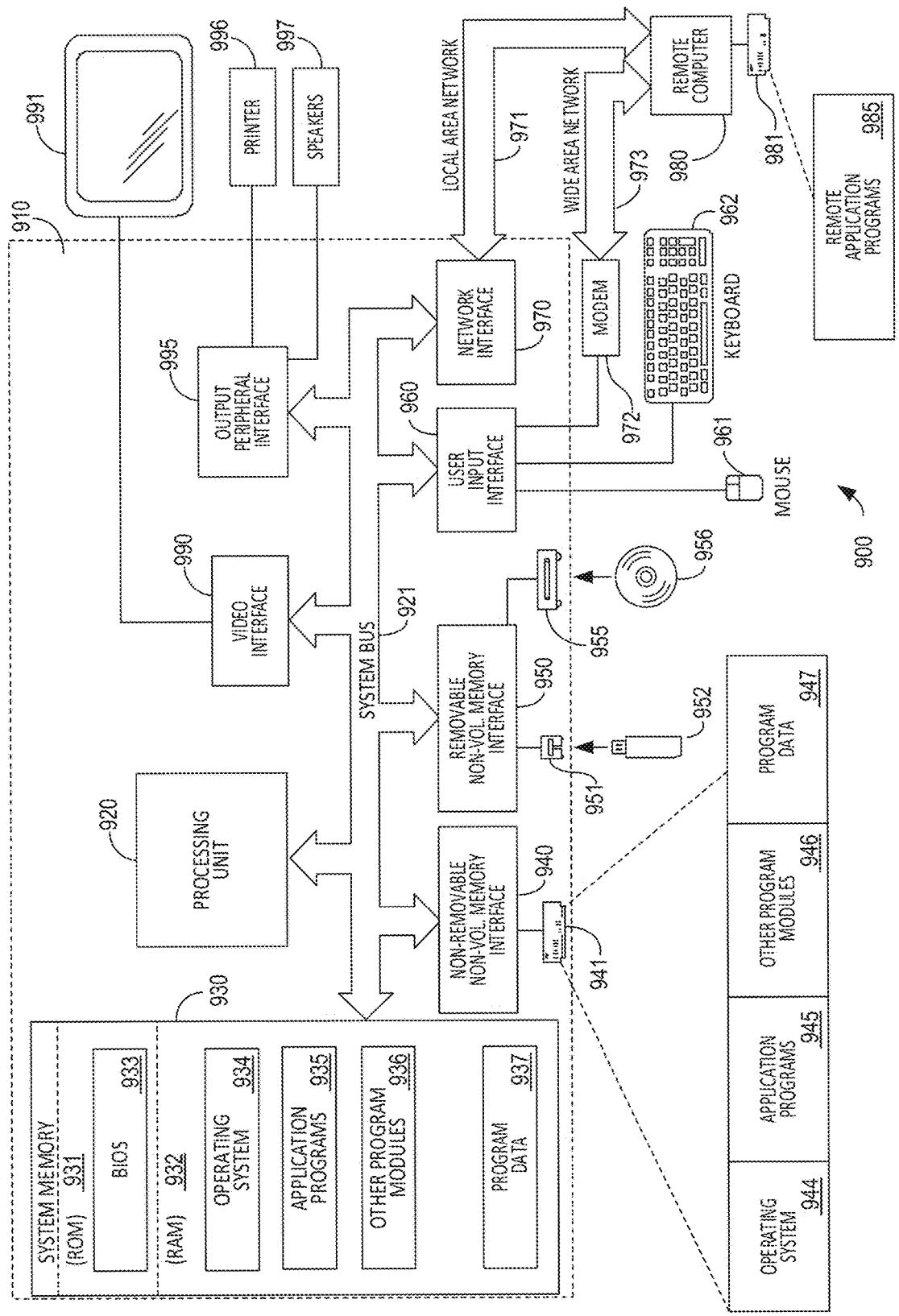
FIG. 9 illustrates an example of a computing system environment on which aspects of the invention may be implemented.

FIG. 9 illustrates an example of a suitable computing system environment 900 on which the technology described herein may be implemented. For example, computing environment 900 may form some or all of the computer system 810 shown in FIG. 8. The computing system environment 900 is only one example of a suitable computing environment and is not intended to suggest any limitation as to the scope of use or functionality of the technology described herein. Neither should the computing environment 900 be interpreted as having any dependency or requirement relating to any one or combination of components illustrated in the exemplary operating environment 900.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the technology described herein includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a flash drive 951 that reads from or writes to a removable, nonvolatile memory 952 such as flash memory, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of removing debris from a liquid photopolymer in an additive fabrication device, the additive fabrication device comprising a container and a build platform and configured to form layers of solid material on the build platform by photocuring liquid photopolymer in the container, the method comprising:
   forming a mesh of solid material adhered to an interior surface of the container by directing actinic radiation onto the liquid photopolymer in the container, wherein the mesh of solid material is formed from a single layer of material; and
   separating the mesh of solid material from the container subsequent to one or more particles of debris within the liquid photopolymer becoming adhered to the mesh of solid material.

2. The method of claim 1, further comprising detecting at least some of the one or more particles of debris within the liquid photopolymer and forming the mesh of solid material based on locations of the detected particles of debris.

3. The method of claim 2, further comprising generating a geometrical description of the mesh based on the locations of the detected particles of debris.

4. The method of claim 1, wherein the mesh of solid material is formed in contact with the build platform.

5. The method of claim 1, further comprising, prior to forming the mesh of solid material, detecting that fabrication of an object failed, and forming the mesh of solid material based on a geometrical description of the object for which fabrication failed.

6. The method of claim 1, wherein the additive fabrication device comprises a wiper and wherein said separating of the mesh of solid material from the container comprises applying force from the wiper to the mesh of solid material.

7. The method of claim 1, further comprising forming an inhibition layer adjacent to the interior surface of the container, wherein the mesh of solid material is formed adjacent to the inhibition layer such that the mesh of solid material is adhered to the interior surface of the container via the inhibition layer.

8. The method of claim 1, wherein the mesh of solid material comprises solid material arranged in a grid pattern.

9. The method of claim 1, further comprising, prior to forming the mesh of solid material, determining at least one scale of the mesh of solid material based on an expected size of the one or more particles of debris.

10. A method of configuring an additive fabrication device to remove debris from a liquid photopolymer in the additive fabrication device, the additive fabrication device comprising a container and a build platform and configured to form layers of solid material on the build platform by photocuring liquid photopolymer in the container, the method comprising:
    generating, using at least one processor, instructions that, when executed by the additive fabrication device, cause the additive fabrication device to:
        form a mesh of solid material adhered to an interior surface of the container by directing actinic radiation onto the liquid photopolymer in the container, wherein the mesh of solid material is formed from a single layer of material; and
        separate the mesh of solid material from the container subsequent to one or more particles of debris within the liquid photopolymer becoming adhered to the mesh of solid material.

11. The method of claim 10, wherein the instructions, when executed by the additive fabrication device, cause the additive fabrication device to form the mesh of solid material in contact with the build platform.

12. The method of claim 10, further comprising detecting at least some of the one or more particles of debris within the liquid photopolymer and wherein the instructions are generated based on locations of the detected particles of debris.

13. The method of claim 12, further comprising generating a geometrical description of the mesh based on the locations of the detected particles of debris.

14. The method of claim 10, further comprising detecting that fabrication of an object failed, and wherein the instructions are generated based on a geometrical description of the object for which fabrication failed.

15. The method of claim 10, wherein the instructions, when executed by the additive fabrication device, separate the mesh of solid material from the container subsequent to the one or more particles of debris becoming adhered to the mesh of solid by waiting for a predetermined period of time after forming the mesh of solid material prior to separating the mesh of solid material from the container.

16. The method of claim 10, wherein the instructions, when executed by the additive fabrication device, cause the additive fabrication device to form a removal tab coupled to the mesh of solid material.

* * * * *